E. RYNEARSON.
METER BOX.
APPLICATION FILED AUG. 10, 1911.

1,092,400.

Patented Apr. 7, 1914.

WITNESSES:

Eugene Rynearson.
INVENTOR

ATTORNEY

UNITED STATES PATENT OFFICE.

EUGENE RYNEARSON, OF DALLAS, TEXAS.

METER-BOX.

1,092,400.
Specification of Letters Patent.
Patented Apr. 7, 1914.

Application filed August 10, 1911. Serial No. 643,299.

*To all whom it may concern:*

Be it known that I, EUGENE RYNEARSON, a citizen of the United States, residing at Dallas, in the county of Dallas and State of Texas, have invented certain new and useful Improvements in Meter-Boxes, of which the following is a specification.

My invention relates to new and useful improvements in meter boxes. Its object is to provide a meter box of extensible length to protect and incase meters used in conjunction with underground mains, the box being buried with its top flush with the surface of the ground, and being so constructed as to resist vertical displacement when thus buried.

A further object is to provide a novel locking mechanism to prevent removal of the meter box cover, except by authorized parties provided with a suitable key.

Finally the object of the invention is to provide a meter box of light construction, yet strong and durable, that will be comparatively inexpensive to construct, and which may be adjusted to accord with the depth of the mains carrying the meter received by the box.

Figure 1:
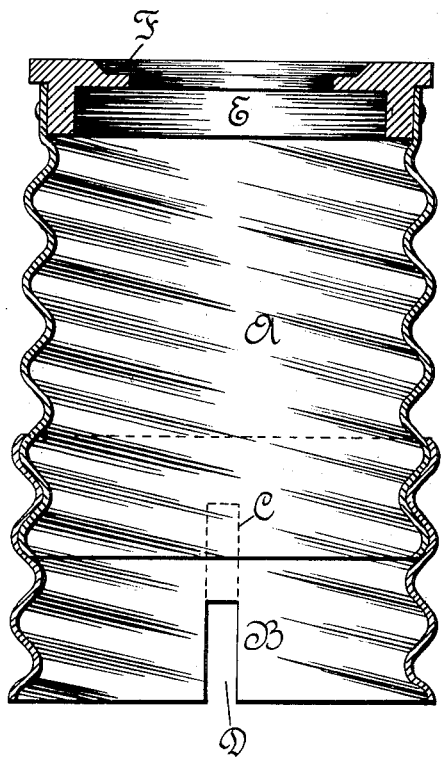
Figure 3:
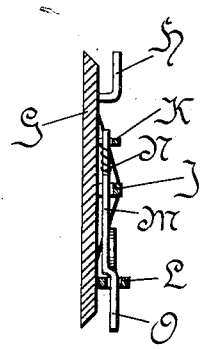
Figure 2:
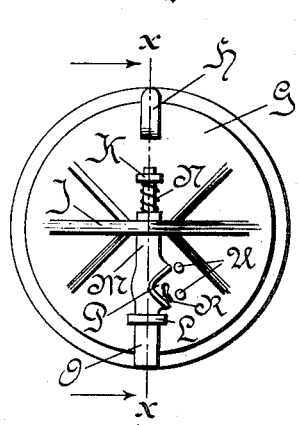
Figure 4:
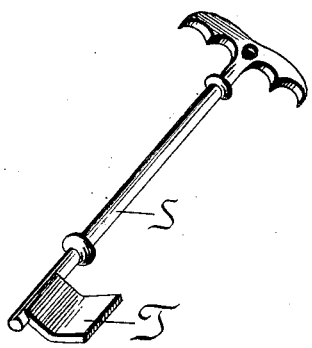

With these and various other objects in view, my invention has relation to certain novel features of the construction and operation, an example of which is described in the following specification, and illustrated in the accompanying drawing, wherein:

Figure 1 is a vertical sectional view of the meter box, with the cover thereof removed, the two-part construction of the box and its spiral corrugations being clearly shown in this view. Fig. 2 is a view showing the cover of the box as seen from the underside thereof. Fig. 3 is a view of the cover in cross-section, the section being taken upon the line x—x of Fig. 2. Fig. 4 is a detail perspective view showing the key, which is to be used in conjunction with the locking mechanism of the box cover.

Referring now more particularly to the drawing, wherein like letters of reference designate similar parts in all the figures, the letters A and B respectively denote the upper and lower component members of the box, said members being cylindrical in form and the lower extremity of the upper member being inserted in the upper extremity of the lower. Both members are provided with a continuous spiral corrugation, so that the joint between them has the nature of a screw-threaded connection, making it possible for the length of the meter box to be increased or decreased by screwing the member A out of or into the member B. Both of these members will preferably be made from ordinary sheet metal, rolled into cylindrical form, and having the connecting edges of the cylinder slightly displaced with relation to each other, longitudinally with the joint, so that the corrugations receive the form of one continuous spiral, the ends of the cylinder being later trimmed to remove the off-set portions formed by the relative displacement of the connected edges. The member B will have a vertical tongue C cut in its lower extremity and turned up against the side of the member as shown in Fig. 1, thus forming a slot D adapted to receive the pipe leading to the meter within the box.

The meter-box will be provided at its top with a ring E preferably of cast-iron, furnishing a seat for the cover of the box. A portion of the ring E will fit closely within the member A of the box, and will be secured thereto by any suitable means, and a portion of the ring E will slightly overhang the top of the member A. In this last portion will be provided a circular aperture, bordered by a beveled flange F which forms the seat. The meter-box cover G is so proportioned as to have its top flush with the top of the ring E when resting upon the seat F. The edge of the cover will be beveled to the same slope as the seat F, so that the cover will fit snugly in place, leaving no crack at its edge where dirt may accumulate, or wedges may be inserted by unauthorized parties in an endeavor to remove the cover. A lug H projects perpendicularly from the underside of the cover adjacent to the edge, and is provided with a right angle bend, so that it projects laterally a sufficient distance to cause it to extend beneath the flange F when the cover is in position. A diametral rib J is provided upon the under surface of the cover perpendicular to a diameter passing through the lug H. The rib J, in conjunction with a pair of lugs K and L, furnishes a sliding bearing for a bolt M, diametrally mounted beneath the cover and having its extremity, which rests in the lug K, reduced in diameter, a coiled spring N being mounted upon the reduced portion between the lug K and the shoulder formed at the junction of the reduced portion with the body of the bolt. This spring exerts a constant pressure upon the bolt tending to thrust it forward to such a position that its other extremity, carrying the bolt-head O, will project beneath the flange F when the cover is in place upon the meter box. At one side of the bolt M, there is provided a groove P, the walls of which are perpendicular to the cover, and approach each other at an angle of approximately ninety degrees. Opposite to the groove P, a key hole R is provided in the cover, said key hole being slightly curved in form. This key hole is adapted to permit the passage of a key S, carrying a curved arm T adapted to pass readily through the key hole. The relation of the key-hole to the walls of the groove P is such that when the key is inserted and slightly rotated, the arm T will bear against one of said walls and will slide the bolt M through a sufficient displacement to withdraw the bolt-head from beneath the flange F, the spring N being compressed during such displacement. The cover may then be removed by simply exerting an upward pull upon the key, said key being sufficiently strong in construction to serve as a handle to raise the cover of the meter-box. While the meter is being read, the key may be left inserted in the key-hole, and will be again used as a handle in replacing the cover upon the box. When the key is removed from the cover, the latter will be bolted automatically through the action of the spring N.

By providing the cover with a beveled edge, and producing a similar bevel upon the seat which receives the cover, the possibility is removed of the cover being frozen, or rusted, so as to prevent its removal, as might happen in case the cover edges were vertical, and the circular walls of the seat were also vertical.

The corrugated metal, of which the above described box is constructed, has been found to surpass the cast-iron ordinarily used for this purpose in a number of ways. The corrugated metal is lighter and less expensive, equally strong, and less easily displaced by wash-outs or any other cause. The adjustability in length is important, since it frequently happens that water mains and other mains, in conjunction with which the box may be used, are buried at unequal depths in different places. It is to be noted that the locking mechanism positively prevents access to the interior of the box, except by authorized parties who are provided with a key of the type shown in Fig. 4.

Various changes in the form, or proportion of parts of the above described invention might be made without departing from the spirit, or sacrificing the advantages thereof, and the right is, therefore, reserved to make all such changes, and alterations as may be included within the scope of the following claim.

What I claim is:

In a locked meter box, a cylindrical box member, an annular shouldered and flanged ring secured in the upper end of the member, a cover fitting in the ring on the flanged portion thereof, a diametrical rib depending from the under side of the cover, a lug at right angles to the rib depending from the cover in position to engage the flange of the ring, a plunger passing transversely through the rib in position to engage the flange of the ring diametrically opposite to the lug, supports for the plunger on each side of the rib, and a coiled spring confined on the plunger and bearing against one of the supports.

In testimony whereof I have signed my name to this specification in the presence of two subscribing witnesses.

EUGENE RYNEARSON.

Witnesses:
J. S. MURRAY,
L. MORRIS.